United States Patent [19]

Anderson

[11] 4,106,441
[45] Aug. 15, 1978

[54] POWER TRANSLATION MACHINE WITH OSCILLATING PISTON

[76] Inventor: Thomas W. Anderson, 1209 Boxwood La., Apex, N.C. 27502

[21] Appl. No.: 760,749

[22] Filed: Jan. 19, 1977

[51] Int. Cl.² ............................................. F02B 53/00
[52] U.S. Cl. ................................. 123/18 R; 417/481
[58] Field of Search ............................ 92/120; 91/339; 123/18 R; 417/481, 482

[56] References Cited

U.S. PATENT DOCUMENTS

| 536,393 | 3/1895 | Rice | 123/18 R |
|---|---|---|---|
| 2,127,743 | 8/1938 | Linthwaite | 123/18 R |
| 2,257,884 | 10/1941 | Mize | 123/18 R |
| 3,315,648 | 4/1967 | Castillo | 123/18 R |
| 3,871,337 | 3/1975 | Green | 123/18 R |
| 3,874,346 | 4/1975 | Frietas | 123/18 R |

FOREIGN PATENT DOCUMENTS 2,256,776  6/1974  Fed. Rep. of Germany ........ 123/18 R

*Primary Examiner*—Ronald H. Lazarus
*Attorney, Agent, or Firm*—C. A. Phillips

[57] ABSTRACT

An internal combustion engine wherein each piston is relatively flat and is journalled to oscillate in a cavity defined by a sector of a cylinder. Thus, the piston forms two work chambers, one on each side of the piston, and each work chamber is equipped with appropriately timed intake and exhaust valves and one or more spark plugs.

3 Claims, 10 Drawing Figures

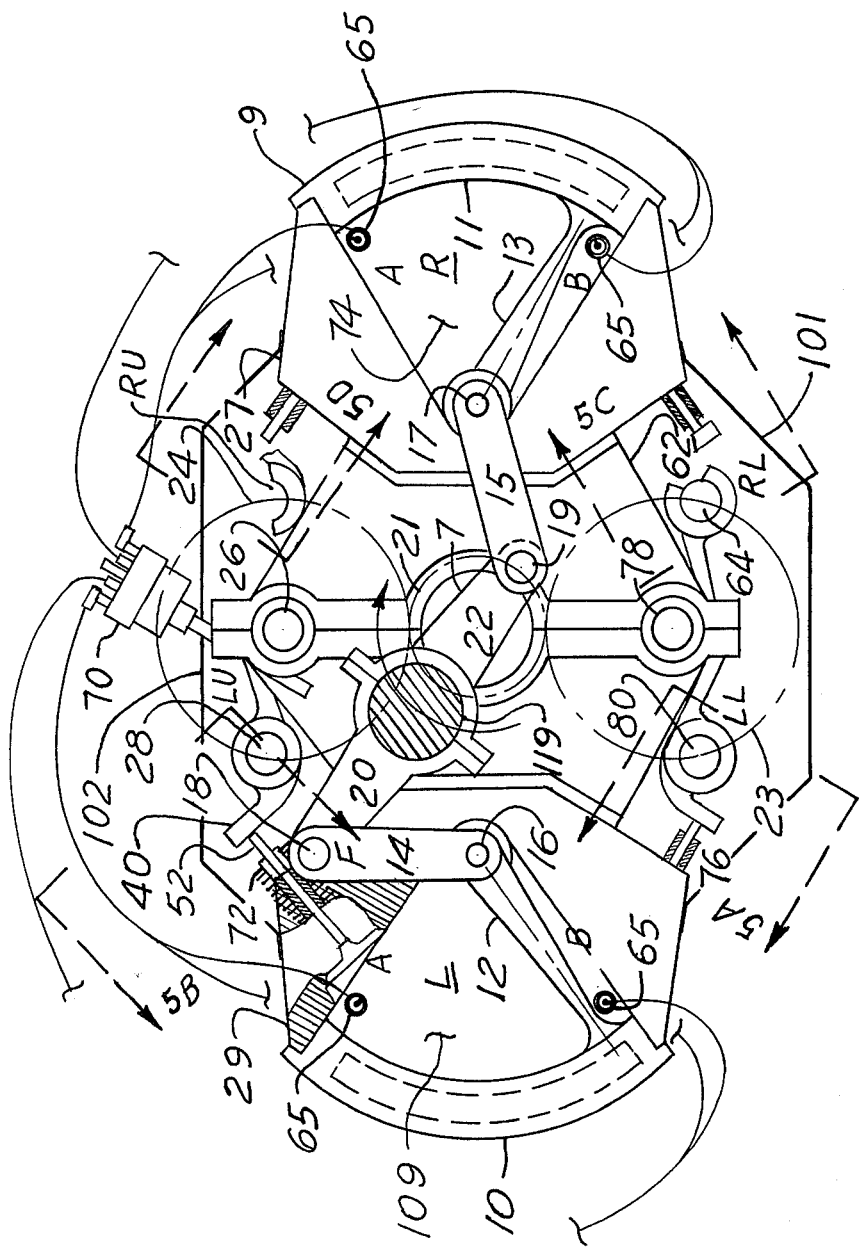

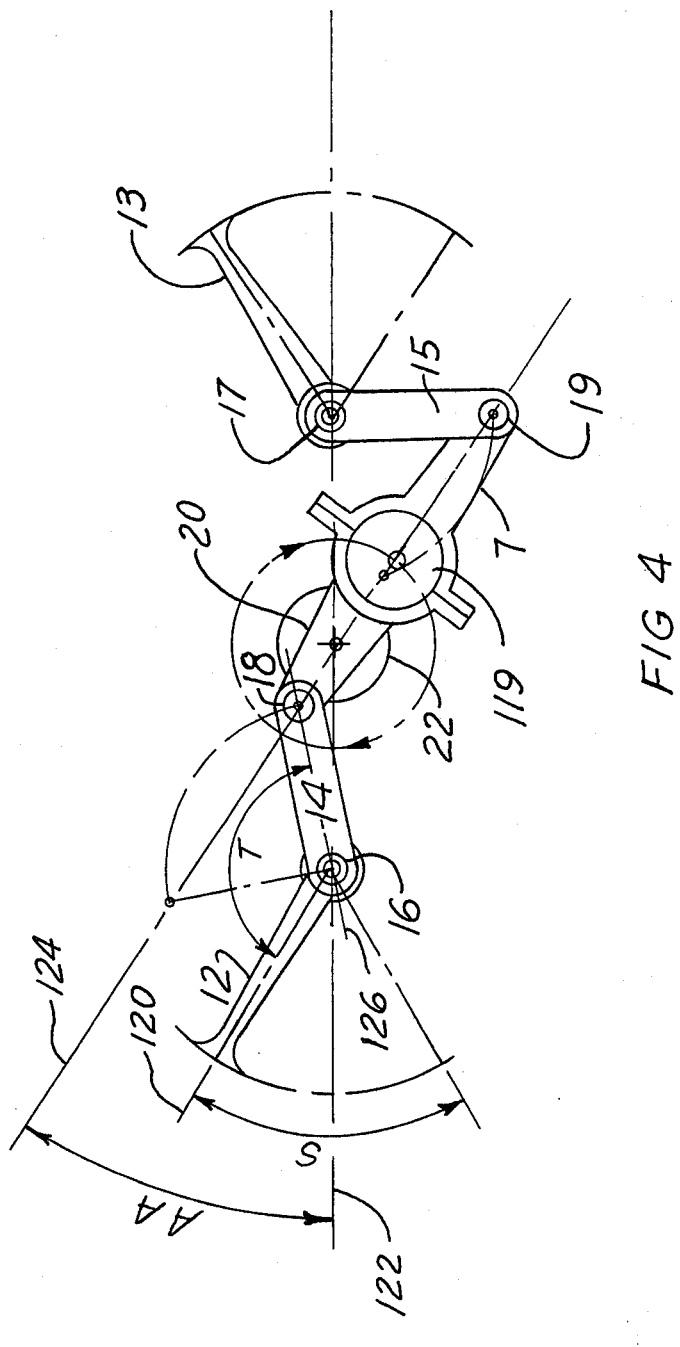

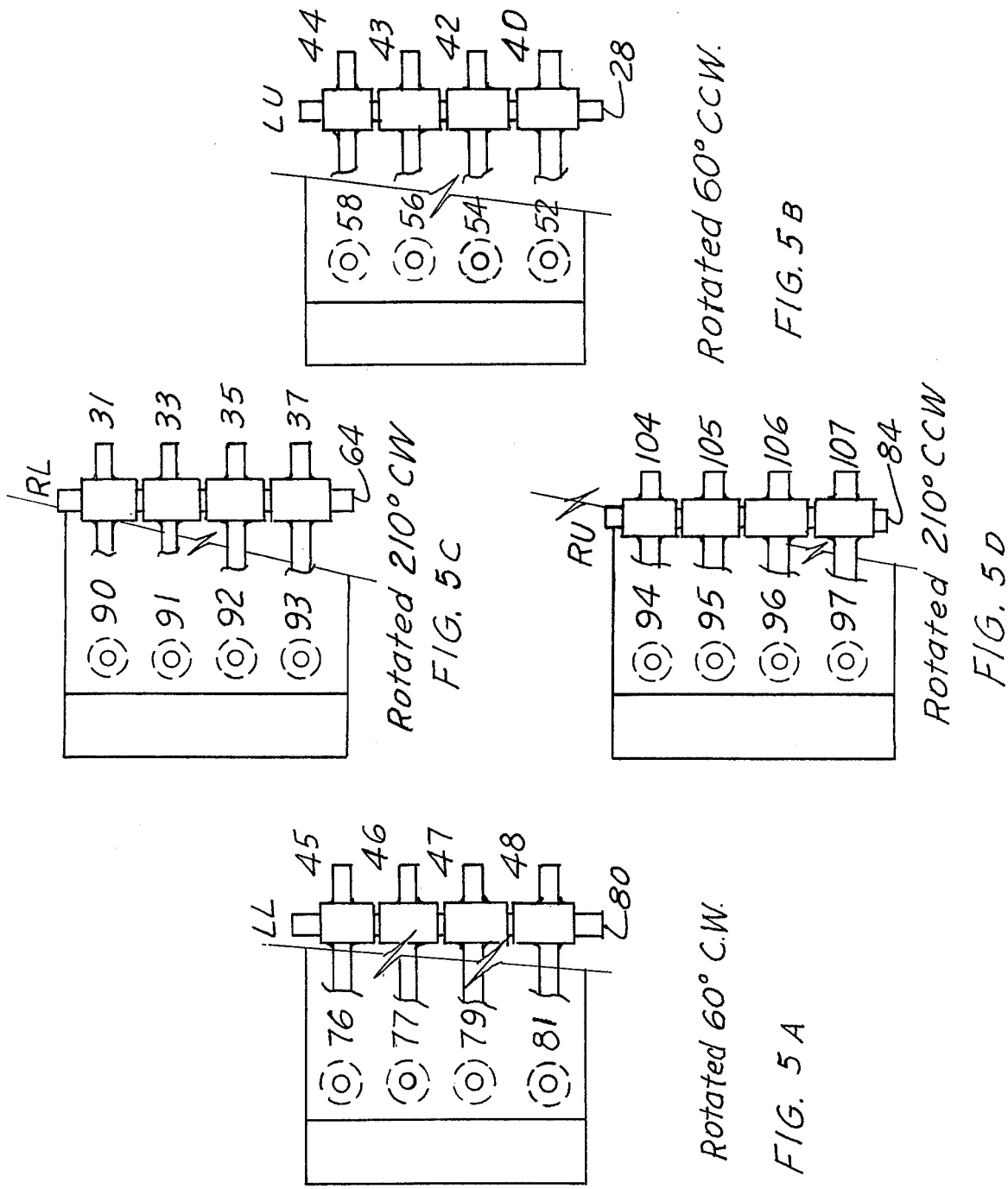

POWER TRANSLATION MACHINE WITH OSCILLATING PISTON

BACKGROUND OF THE INVENTION

1. Field of the Invention

This invention relates to machines for the translation of power between pressure within a confined space and the rotation of a shaft, and is particularly adapted to function as an engine or a compressor.

2. General Description of the Prior Art

Power translation devices of the character of engines and compressors have been constructed in many configurations, both reciprocating and rotary, and despite a tremendous effort toward improvement and the many embodiments of such machines which have been proposed over the past 100 years or so, the search goes on for a simpler and more efficient configuration.

It is a particular object of this invention to provide a simpler configuration of power translation machines, and particularly to provide a form of internal combustion engine which will be lighter and cheaper to manufacture and yet is efficient in operation.

SUMMARY OF THE INVENTION

In accordance with this invention, one or more pressure enclosures would be employed, each being defined by a sector of a cylinder with respect to a discrete first axis of a discrete length, the sector dimensions extending angularly 60° to 90°. A relatively flat piston would be journalled to oscillate about the first axis in each such enclosure, thus forming two work chambers, one on each side of the piston. At least one, appropriately timed, intake valve, exhaust valve, and spark plug would be coupled to each work chamber. A second shaft, an engine drive shaft, would be spaced from and parallel to the first shaft and journalled for 360° rotation. Separate cranks would be rigidly connected to each of the shafts, and a pivotal linkage would interconnect them. The attachment of the cranks, their length and the length of the linkage are such as to enable each piston to move from one extreme position in an enclosure to an opposite extreme position during a 180° rotation of the second shaft. The valves and spark plug would be timed by conventional drives coupled to the second shaft. This configuration enables the construction of a double acting machine, which means, for example, that an Otto cycle engine may be constructed wherein opposite phases of the four stroke cycle of the engine are occurring simultaneously in a single enclosure, one phase or stroke on each side of the piston. That is to say, when compression or exhaust is taking place on the first side of the piston, intake or firing is taking place on the other or second side of the piston; and when intake or firing is taking place on the first side, compression or exhaust is taking place on the second side. Thus, effective displacement of such an engine is twice the actual displacement. It is thus clear that this configuration dramatically reduces the weight and thereby increases the efficiency of the engine when employed in mobile applications.

BRIEF DESCRIPTION OF THE DRAWINGS

FIG. 3 is a view, partially in section, along lines 3—3 of FIG. 2.

FIG. 4 is a front view of the basic moving components of the engine shown in FIGS. 2 and 3.

FIGS. 5A–5D are schematic illustrations of the valves as they would be observed along lines 5A–5D of FIG. 3 and with views rotated as indicated.

DETAILED DESCRIPTION OF THE DRAWINGS

Figure 1:
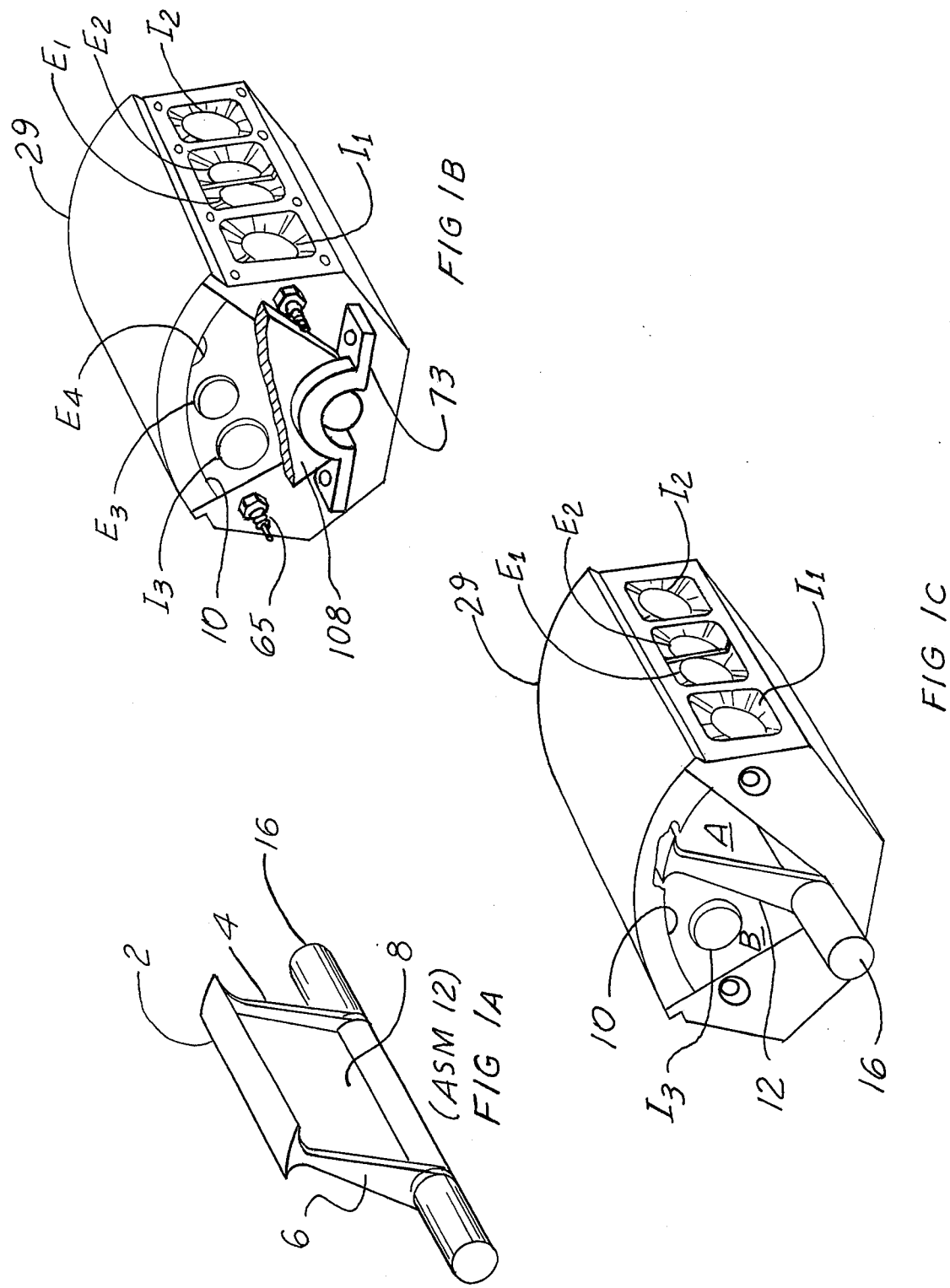
FIGS. 1A–1C are pictorial views illustrating the piston and work enclosure of a machine constructed in accordance with this invention.

Referring initially to FIGS. 1A–1C, piston 12 is rigidly mounted on or formed together with shaft 16 and includes a relatively thin rectangular plate 8 and perpendicular reinforcement members 2, 4, and 6, the latter two being adapted to seal against end closures 108 and 109 (FIG. 2), and would typically have sealing piston rings in grooves in the surfaces thereof (not shown). Thus, enclosure LA, LB (FIG. 3), formed by sector 10 of cylinder 29 and end plates 108 (front shown in FIG. 1B) and 109, is effectively divided into two pressure chambers, A and B, one on each side of piston 12. Each chamber has its own set of conventional valve ports and a spark plug or spark plugs 65. As shown in FIG. 1C, there are two intake valve ports, ports I1 and I2, and two exhaust valve ports, ports E1 and E2. While dual sets of valves and spark plugs are shown for each pressure chamber for enhanced operation, it is to be appreciated that single units of each may be employed.

Figure 2:
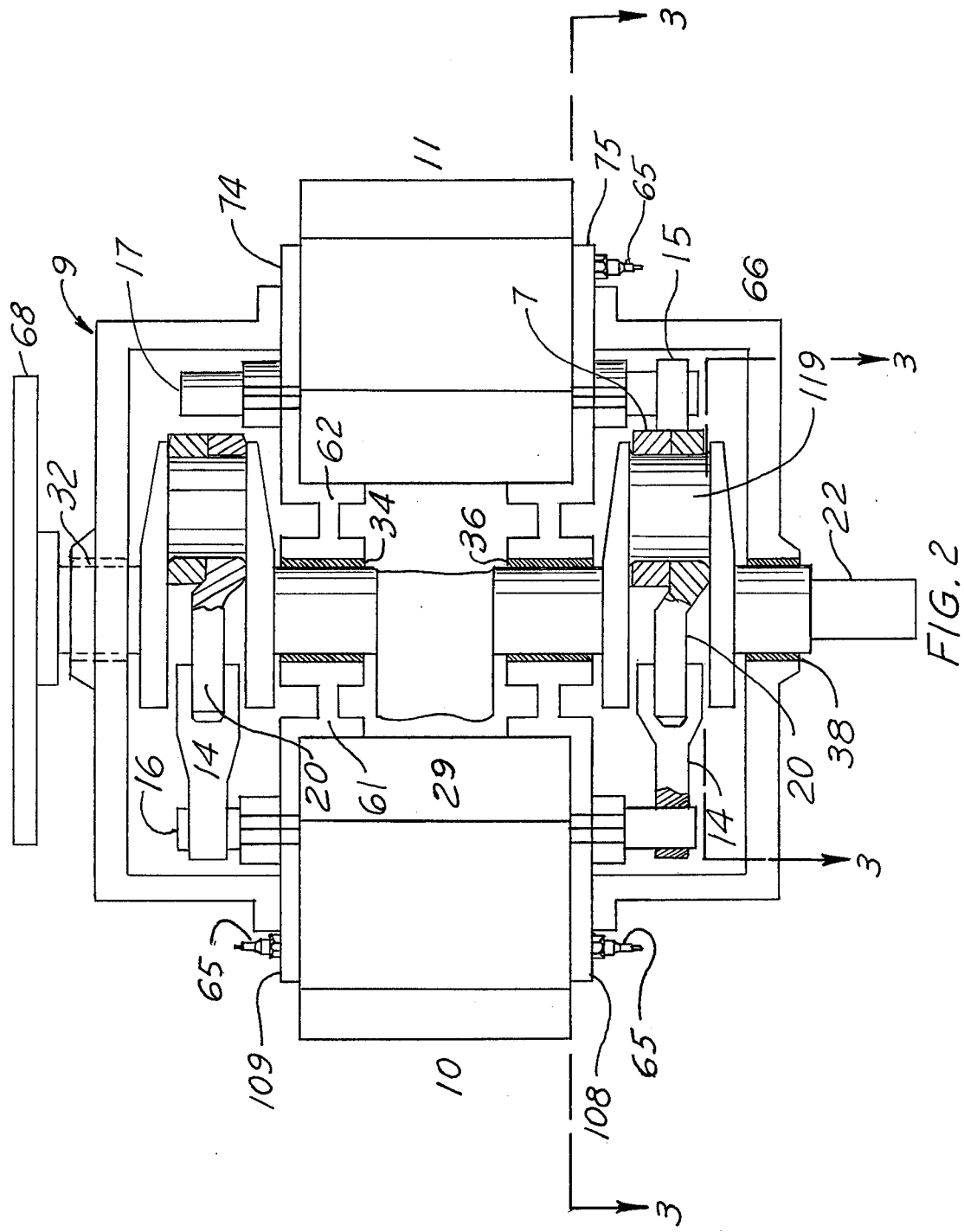
FIG. 2 is a top view, partially broken away, of an internal combustion engine constructed in accordance with this invention.

Referring to FIGS. 2 and 3, there is shown an internal combustion engine 9 wherein there are two enclosures, enclosures L and R, positioned on each side of drive shaft 22. Pressure chambers LA and LB comprise upper and lower pressure chambers on sides of piston 12 on the left side of engine 9, and pressure chambers RA and RB are formed on either side of piston 13 in chamber R on the right side of engine 9. Additionally, referring to FIG. 4, piston 12 and crank 14 are rigidly connected together and to shaft 16, and similarly, piston 13 and crank 15 are rigidly connected to shaft 17. The other end of crank 14 is pivotally connected by shaft or pin 18 to one end of link 20, and the opposite end of link 20 is pivotally attached to a crank throw 119 of crankshaft 22. Similarly, piston 13 and one end of link 15 are rigidly connected to shaft 17, and an opposite end of link 15 is pivotally attached to one end of link 7, and the opposite end of link 7 is pivotally attached to throw 119 of crankshaft 22. Drive shaft 22 rotably drives cam shafts 26 and 78 through gear connections (not shown) at position circles 23 and 24 (FIG. 3). Cam shafts 26 and 78 then drive upper LU and RU and lower LL and RL banks of rocker arms, which in turn operate the valves in the timing pattern, which will be further described. Distributor 70 is driven from cam shaft 26 in a conventional manner and functions conventionally to provide a spark to top and bottom sets of spark plugs 65 in pressure chambers LA, LB, RA, and RB.

As shown in FIGS. 5A–5D, intake valves 52 and 58, operated by rocker arms 40 and 44, supply chamber LA; intake valves 76 and 81, operated by rocker arms 45 and 48, supply chamber LB; intake valves 97 and 94, operated by rocker arms 104 and 107, supply chamber RA; and intake valves 90 and 93, operated by rocker arms 37 and 31, supply chamber RB. Similarly, exhaust valves 54 and 56, operated by rocker arms 42 and 43, enable exhaust from chamber LA; exhaust valves 77 and 79, operated by rocker arms 46 and 47, enable exhaust from chamber LA; exhaust valves 77 and 79, operated by rocker arms 46 and 47, enable exhaust from chamber LB; exhaust valves 95 and 96, operated by rocker arms 105 and 106, enable exhaust from chamber RA; and exhaust valves 91 and 92, operated by rocker arms 33 and 35, enable exhaust from chamber RB. These valves would be opened and closed in a conventional manner, depending upon the function assigned to the pressure chamber to which they are connected.

Referring to FIG. 4, the angle T formed by the centerline 120 of piston 12 and the centerline 126 of torque arm 14 is determined by the following formula:

$$T = 90° + (S/2) - ([S/2] - AA)$$

where:

$S$ is the angular sweep of piston 12, and is at least twice the magnitude of angle $AA$; and angle $AA$, referred to as the angle of action, is defined as the angle formed by line 122 passing through the center of piston shaft 16, shaft 17, crankshaft 22, and line 124 passing through the center of crankshaft 22, the center of pins 18 and 19 when pistons 12 and 13 are in extreme limits of their travels. Where only one piston is involved, say, piston 12, the reference to pin 19 would not be pertinent.

The number of degrees of arc that the piston would move through would depend upon the requirements of a particular engine. The lower limit would be approximately 60°, and the upper limit would be 90°. The length of the piston and width of it would depend upon the desired displacement. As an example of a configuration, with a sweep of approximately 72° and an angle of action ($AA$) of approximately 30°, the angle of T would be approximately 120°.

Carburetion, cooling, and oiling systems would be conventional and are not further described.

Thus, covers such as valve covers 101 and 102, shown in FIG. 3, and with appropriate structural strength, would enclose moving parts so as to control the oil for recollecting to an oil pump (not shown) and also to seal the engine from dirt.

While the engine as shown has two pistons and four firing chambers, it is to be appreciated that only a single piston with two firing chambers may be employed, or a greater number than shown may be employed.

To examine the operation of engine 9, it will be assumed that by means of an electrical starter conventionally connected to flywheel 68 (FIG. 2), shaft 22 is rotated clockwise. As will be noted in FIGS. 3 and 5, piston 12 would then be moved from point B toward point A. Valves 52, 54, 56, and 58 would be initially closed. The volume in chamber LA would thus be reduced to a selected minimum. This will occur when crank 119 is near an operating dead center position, as shown, and at that point, distributor 70 would be timed to provide an electrical impulse to fire lefthand spark plugs 65. It will be assumed that prior to the movement of piston 12 as described, there had preceded a stroke downward, during which a fuel mixture had been drawn into chamber LA through intake valves 40 and 44 (FIG. 5B) from a carburetor (not shown).

During this same initial upstroke of piston 12, there would have been a firing stroke in chamber LB, an exhaust stroke in pressure chamber RA, and an intake stroke in compression chamber RB.

There would next occur a firing stroke in pressure chamber LA, an exhaust stroke in pressure chamber LB, an intake stroke in pressure chamber RA, and a compression stroke in pressure chamber RB.

Next, there would occur an exhaust stroke in pressure chamber LA, an intake stroke in chamber LB, a compression stroke in chamber RA, and a firing stroke in chamber RB.

Finally, there would occur an intake stroke in pressure chamber LA, a compression stroke in pressure chamber LB, a firing stroke in pressure chamber RA, and an exhaust stroke in pressure chamber RB.

The foregoing steps describe a full set of functions for each firing chamber and would be repeated in this sequence during engine operation. As crank shaft 22 is turned in a manner described, torque would be deliverable through shaft 22 to a drive train coupling the engine to a point of work usage, such as a drive train of an automobile.

As will be noted, the basic force generating elements of the invention, enclosure 10 and piston 12 are of a quite simple configuration and can be economically cast or forged. As decribed above, double action is provided by each cylinder enabling an extremely low weight-to-horsepower factor.

While there has been described a gasoline powered internal combustion engine, it is to be appreciated that the invention lends itself to diesel engine construction (by making the cranks sufficiently rugged) and to compressor and pump fabrication.

Having thus described my invention, what is claimed is:

1. A machine for the translation of power between pressure within a confined space and rotation of a shaft comprising:

at least one enclosure defined by a sector of a cylinder with respect to a discrete first axis of a discrete length, and the sector dimension extending angularly 60° to 90°;

a first shaft concentric with said first axis, and a relatively flat piston journalled on said first shaft and positioned and configured to oscillate angularly within said enclosure over at least a portion of the angular displacement available in said enclosure, and forming on opposite sides of the piston the combination of progressively increasing and decreasing first and second cavities of confined spaced;

at least two valves, an intake valve and an exhaust valve, connected to at least one of said cavities, and including means for opening said intake valve during at least a portion of movement of said piston effecting an expansion of said one cavity, and opening said exhaust valve during at least a portion of movement of said piston, effecting a contraction in volume of said one cavity;

a first crank rigidly affixed about a first axis at one end to said first shaft and having a pivotal coupling about a second axis on said first crank at a point spaced on it from said first shaft;

a second shaft spaced from said first shaft and journalled for 360° rotation about a third axis parallel to said first shaft;

a second crank rigidly affixed at one end to said second shaft and having a pivotal coupling at a fourth axis on said second crank at a point spaced on it from said second shaft;

a linkage pivotally connecting between said pivotal couplings of said first and second cranks; and said cranks and said linkage being of relative lengths, whereby said piston will move from one extreme position in said enclosure to an opposite extreme position in said enclosure during a 180° rotation of said second shaft, and wherein the angle T formed between a plane approximately corresponding to said flat piston and a line through said first and second axes is equal to 90° + (S/2) − [(S/2] − AA), where:

AA is the angle formed between a line passing through said first and third axes and a line extending through said third and fourth axes, and S is an angle at least twice the magnitude of angle AA.

2. A machine as set forth in claim 1 wherein S is approximately 72°, AA is approximately 30°, and angle T is approximately 120°.

3. A machine as set forth in claim 1 wherein said machine comprises:

an internal combustion engine, and wherein at least one intake and one exhaust valve is coupled to each said cavity; and at least one spark plug is connected to each of said cavities.

* * * * *